March 17, 1931.   O. A. GROVE   1,796,367
DENTAL IMPLEMENT
Filed Dec. 12, 1928
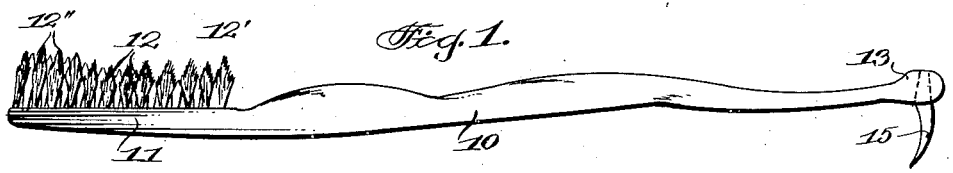
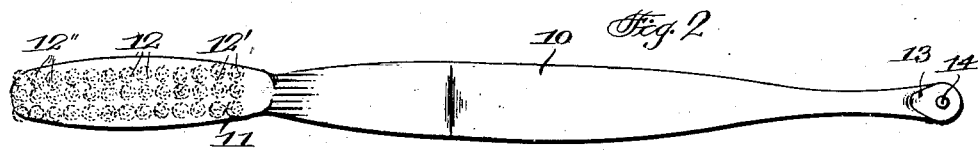
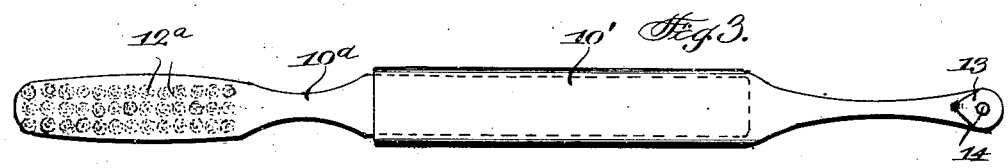
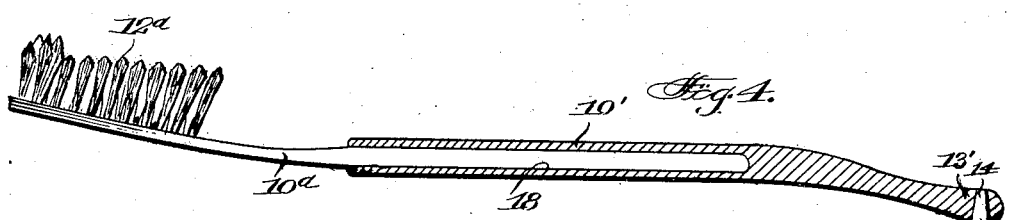
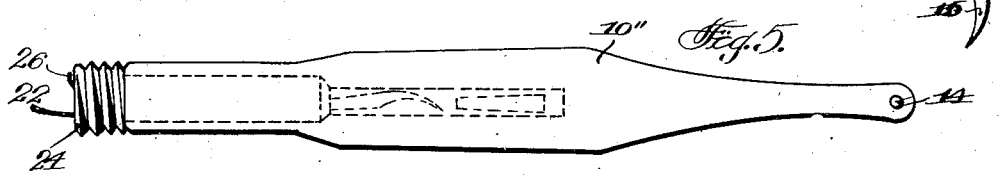
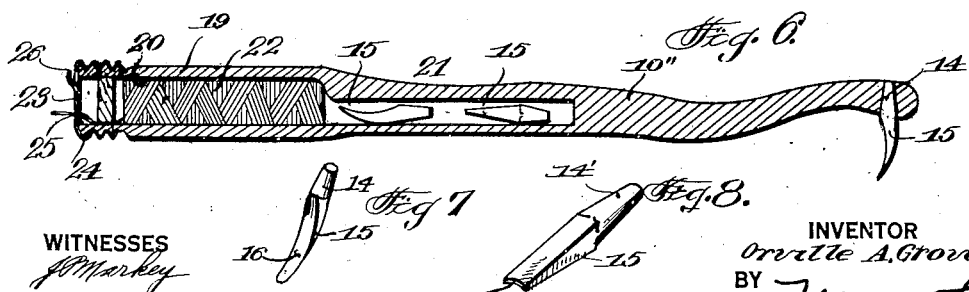
WITNESSES
INVENTOR
Orville A. Grove
BY
ATTORNEY Patented Mar. 17, 1931

1,796,367

UNITED STATES PATENT OFFICE

ORVILLE A. GROVE, OF PALESTINE, TEXAS

DENTAL IMPLEMENT

Application filed December 12, 1928. Serial No. 325,586.

This invention appertains to improvements in dental implements generally, and has for an object to provide a type of the same which will be thoroughly effective and efficient for use by a layman in accomplishing a toilet of the oral cavity generally, and especially the removing of the salivary calculus deposited at the gingival line by the salts contained in the saliva excreted from the salivary glands, and the cleaning out of the space below the gum line, known as the sub-gingival space, which space is being constantly filled with an injurious deposit, known as serumnal calculus formed by the hardening of the calco-globulin, both of which are the most frequent predisposing cause of marginal gingivitis and pyorrhea alveolaris with an ultimate loss of teeth.

Another object of the invention is to provide an implement of the class set forth, and which is preferably a combination of cleansing media, whereby an oral prophylaxis, or complete toilet of the teeth, the gingival and sub-gingival tissues and gums may be readily made with the one implement embodying such cleaning media.

A further object of the invention is to provide an implement of the character mentioned, which is preferably in the form of a handle having, in any case, the general configuration of any one of the standard types of tooth brush handles, and which is provided with a detachable or interchangeable blade or point at one end for use in removing the salivary and serumnal calculus excreted by the salivary glands and sub-gingival tissue respectively, from the gingival and sub-gingival spaces aforesaid, while the opposite end of the same may be provided with a usual or special form of tooth brush head, or with an enclosed cavity in which is housed a supply of dental floss or the like, and one or more extra blades or points.

Another object of the invention is to so mount a blade or point in the handle end that the longitudinal axis of the same is always disposed at right angles to the corresponding axis of the handle, and also that the blade or point may be rotated to different positions of use relatively to the handle, and sustained in any adjusted position by the frictional engagement of the connected portions thereof.

A further object of the invention is to provide a combined tooth brush and working point or tool, wherein the point or tool is provided with a more blunt working end than that of the gingival cleaning point aforesaid, and is to be substituted for the latter for the purpose of securing abrasive action with pumice or tooth powder to remove green stain on children's teeth, or other stains on teeth, not ordinarily removable by the friction of the bristles of tooth brushes.

A still further object of the invention is to provide an implement of the type mentioned, wherein the blades or points to be employed in conjunction therewith are perferably made from orange wood, so as to avoid injury, as far as possible, to the enamel of the teeth and the gingivæ surrounding the base of the exposed portions of the teeth, and shaped to concaved form at one side to fit around the convexity of the crown of the teeth, but otherwise thin and somewhat flat, with the opposite corners of the working end rounded off in order that it may be readily inserted into the gingival and sub-gingival spaces aforesaid with the least possible chance for injury to the surrounding gingivæ.

With the foregoing and other equally important objects and advantages in view, the invention resides in the certain new and useful combinations, constructions and arrangements of parts as will be hereinafter more fully described, set forth in the appended claims, and illustrated in the accompanying drawing, in which:

Figure 1 is a side elevation of a preferred embodiment of the improved implement, Figure 2 is a top plan view of the same, Figure 3 is a top plan view of a modified form of the device, wherein the blade or point is carried by a separate handle, which is adapted to be detachably engaged on the handle of an ordinary form of tooth brush.

Figure 4 is a side elevation of an ordinary form of tooth brush showing the handle thereof engaged with the separate handle of the implement, the latter being shown in vertical longitudinal section, Figure 5 is a top plan view of another modified form of the invention, showing the blade or point in combination with a special form of handle which is provided with an enclosed cavity, at the end of the same opposite the end thereof, on which the blade or point is mounted for the housing therein of a supply of dental floss and the like and extra blades or points, Figure 6 is a vertical longitudinal section through the form of the device, as shown in Figure 5, Figure 7 is a perspective view of a preferred form of a blade or point per se to be employed in the treatment of the gingivæ, and Figure 8 is a perspective view of a point to be interchanged with the blade or point as in Figure 7, and employed in polishing the enameled surfaces of the teeth.

Referring to the drawing, wherein like characters of reference designate corresponding parts throughout the several views thereof, and more particularly to Figures 1 and 2, the embodiment of the invention, as shown therein by way of example, is constituted in a handle 10, which has its surfaces smoothed, but otherwise somewhat irregular to facilitate the gripping of the same by the hand of the user, and which is preferably made slightly longer than the usual handle of an ordinary form of tooth brush. The upper side of one end of the handle, as at 11, is flattened to have a number of bristle tufts 12 grouped thereon, and the free ends of each of the tufts are preferably pointed, or of otherwise substantially conical form to assure of the bristle ends entering the interproximal spaces of the teeth. Also, the tufts 12', at the inner end of the heel of the brush head are preferably longer than the intermediately disposed of the same, while similarly the tufts 12'', at the outer end or toe of the head are of a slightly greater height than those forming the heel of the latter, so that the entire intermediate active surface formed by the several bristle tufts is in the form of an irregular curve, which admits of a greater abrasive action thereof on the teeth surfaces, and which intermediate curvature will readily conform to the varying curvature of the natural arched arrangement of the teeth.

The opposite end portion of the handle 10 is of a reduced width and thickness, and terminates at the free end thereof in an enlargement or thickened portion 13, in which a vertically disposed and downwardly flared opening is provided to have inserted upwardly of the same the upper tapered end, or substantially frusto-conical end portion 14, of a blade or point 15 to be employed by the user for cleaning out from the gingival and sub-gingival spaces, about the bases of the teeth, the deposits of salivary and serumnal calculus formed by the precipitated salts of the saliva from the salivary glands deposited at the gingival and the calco-globulin from the serum of the gingival glands deposited in the sub-gingival spaces respectively, on the one hand, or the corresponding attaching portion 14' of a polishing point 15' (Figure 8) to be employed for removing stains and imparting a polish from and to the exposed enamel surfaces of the teeth at the end of the cleaning operation thereon with the brush head. This complemental tapering handle opening and the attaching portions 14 and 14' of the blades or points 15 and 15' provides for the securing of the parts together by the frictional engagement of the opposed surfaces of the opening and the attaching portions, one with the other, and also for the quick attachment or detachment of a blade or point 15 into and from operative position, as well as for the equally quick rotative adjustment of the latter in the opening to bring the working end to a proper angular relation to assure of the easy insertion of the same into the gingival or sub-gingival spaces at any point about the circumference to a tooth.

As shown in Figure 7, the blade or point 15, below the upper tapered attaching portion 14 is gradually reduced in thickness at the opposite sides thereof to form relatively wide front and rear faces of substantially even width throughout their lengths and downwardly to form a very thin penetrating edge at the lower end thereof. The opposite corners of the penetrating edge are preferably rounded off to reduce the liability of any cutting of the gingival or sub-gingival tissues when the point is in use. The rear or inner face of the blade or point is preferably concaved, as at 16, to fit around the bell of a tooth down into the sub-gingival space for the purpose of removing the calco-globulin and soft serumnal deposits, while the front or outer face is preferably rounded off at its opposite side edges to further reduce the thickness at these parts.

In addition to the use of the blade or point 15 for the removal of the salivary calculus and the calco-globulin secretions known as serumnal calculus from the gingival and sub-gingival spaces, the same may also be employed for the introduction into these spaces of a suitable antiseptic, or medicine, and for this purpose, the blade or point will be dipped into an antiseptic solution or medicine and thereafter inserted into the spaces, after the manner of its previous use to remove the deposited secretions.

A polishing point or tool 15' (Figure 8) is to be interchangeably employed with the blade or point 15 (Figure 7), and for the purpose its upper tapered portion 14' will be inserted into the correspondingly tapered opening in the handle end and below the base of the attaching portion 14', the same is uniformly tapered in a downward direction to form a wedge shaped lower end, and the edge of the extreme lower end thereof is preferably formed to provide a curved out portion 17. This curved out portion or concavity 17 is of a shape to conform to the curvature of the buccal and labial surfaces, and is suitable for removing stains from the teeth and, at the same time, imparts a polish to the same.

In the modified form of the invention as shown in Figures 3 and 4, a separate handle member 10' is provided, and the same is suitably recessed, as at 18, inwardly of one end to engage over the end of the handle 10$^a$, opposite to the end on which the bristle tufts 12$^a$ are mounted, of an ordinary or standard form of tooth brush, and, while the other or outer end of the same is made of a reduced width, and then enlarged at its extremity, as at 13'. In this enlargement, an upper tapered opening is formed to receive therein the upper tapered attaching portions 14 and 14', of the points or tools 15 and 15', after the manner as in the first instance of the invention.

Referring to Figures 5 and 6, wherein is illustrated a further modified form of the invention, a handle 10" is of a reduced width toward one end, and then slightly enlarged, as at 13", to have formed therein the upwardly tapered opening for the reception of the upper tapered attaching portions 14 or 14' of either of the points or tools 15 or 15', while the opposite end portion of the same is enlarged to provide an elongated thickened portion 19, in which a cavity or recess 20 is formed. This cavity or recess 20 opens inwardly of the free end of the thickened portion 19, and at its inner end into a smaller cavity or recess 21, extending for a distance into the smaller intermediate portion of the handle.

In the use of this form of handle 10", extra points or tools 15 and 15' will be housed within the smaller cavity 21, while a supply of dental floss 22 will be housed within the larger cavity 20, substantially as shown. The open end of the larger cavity 20 is normally closed by an inserted disc or stopper 23 of cork or the like to prevent moisture having ingress thereto, and this stopper 20 will, in turn be enclosed by a metal cap 24, which is screw threaded onto the handle end. To withdraw suitable lengths of the dental floss 20 from the supply of the same and outwardly of the cavity, the cap 24 is provided with an opening 25 for the free end of the dental floss 20 to project outwardly thereof at all times, and this end of the same is normally engaged beneath a securing tongue 26 struck outwardly from the end wall of the cap 24, when this cleansing medium is not in use. In passing to the opening 25, the dental floss passes at one side of the marginal edge of the cork stopper 23, so as to be frictionally retarded against too free a withdrawal of its end portion in use.

In the use of any one of the devices, one of the points or tools 15 will be secured in the handle opening provided therein for the reception of the same, when the handle end having the point or tool affixed thereto will be inserted into the oral cavity, and the active end of the point or tool passed downwardly of the gingival or sub-gingival spaces surrounding a tooth. By the proper manipulation of the handle in use at the moment, any soft salivary deposits formed by the precipitated salts of the saliva or the soft serumnal deposits formed by the calco-globulin deposits in the spaces aforesaid can be readily loosened up and removed therefrom by the layman making use of the device and with a facility equal, or nearly equal, to that obtaining in the use of the usual type of instruments employed and manipulated by members of the dental profession in operations of this character without injury to the investing tissues. To admit of the working end of the point or tool 15 reaching all parts of the gingival or sub-gingival spaces surrounding the tooth, the angular relation of the broad sides of the same may be readily and easily varied with respect to the handle in use by imparting a rotative movement to the point or tool successively to the most convenient positions for the proper manipulaion of the handle to effect the easy and non-injurious insertion of the working end of the point or tool into the spaces from which the salivary and serumnal deposits, formed by the precipitated salts from the saliva at the gingival space and the serumnal calculus formed by the calco-globulin excretion from the glands of the gingival and sub-gingival tissue, are to be removed.

It is to be particularly noted that the positioning of the blade or point with its major or longer axis disposed in a plane at right angles to the similar axis of a handle has been determined upon as being best suited to the personal use of the implement by a layman, as distinguished from the usual mounting thereof in the professional types of implements employed by dentists in performing an oral prophylaxis on a patient, or the location of the same in any other position, and also that it is desirable that the working end portion of a blade or tool 15 should be of a length sufficient to reach into the sub-gingival spaces associated with the lingual surfaces of all of the teeth and particularly the distal sub-gingival spaces of the third molars, and without the handle coming in contact with the occlusel and incisal surfaces of the teeth. It is also to be noted that either one or the other of the points or tools 15 and 15' may be made integral with the tooth brush or other handle end, if desired.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. A non-professional dental implement of the class described comprising a tooth brush handle having a socket in one side of the end thereof opposite to its brush supporting end, the said socket being arranged on said handle at the side thereof opposite to that on which the usual brush is supported, and a working point adapted to be seated in the said socket in substantially right angular relation to said handle whereby a substantially complete oral prophylaxis of the mouth can be performed by a layman in first making use of the working point to remove calco-globulin and other injurious deposits from the subgingival spaces about the neck portions of the teeth and subsequently making use of the brush to clean the surfaces of the gums and teeth.

2. A non-professional dental implement of the class described comprising a handle having a socket in one side of one end thereof and a working point adapted to be supported in the said socket in substantially right angular relation to the handle whereby a layman can manipulate the working point to effectively remove calco-globulin and other injurious deposits from the subgingival spaces about the neck portions of his or her own teeth as an initial step in a personal oral prophylaxis.

ORVILLE A. GROVE.